(12) United States Patent  
Freudinger

(10) Patent No.: US 7,237,694 B2
(45) Date of Patent: Jul. 3, 2007

(54) FOOD METERING AND DISPENSING DEVICE

(75) Inventor: Mark J. Freudinger, Peotone, IL (US)

(73) Assignee: Quantum Technical Services, Inc., Frankfort, IL (US)

( * ) Notice: Subject to any disclaimer, the term of this patent is extended or adjusted under 35 U.S.C. 154(b) by 517 days.

(21) Appl. No.: 10/936,110

(22) Filed: Sep. 8, 2004

(65) Prior Publication Data

US 2006/0049212 A1   Mar. 9, 2006

(51) Int. Cl.
  *B67D 5/42* (2006.01)
(52) U.S. Cl. ...................................... 222/386; 222/309
(58) Field of Classification Search ................ 222/386, 222/389, 309, 310, 372–376, 251–255, 394, 222/396–399, 400.5, 400.7, 400.8, 402; 141/258–262
  See application file for complete search history.

(56) References Cited

U.S. PATENT DOCUMENTS

| | | | | | |
|---|---|---|---|---|---|
| 3,563,273 | A | * | 2/1971 | Mills | 137/625.69 |
| 3,685,744 | A | * | 8/1972 | Ludy, Jr. | 239/552 |
| 3,901,408 | A | * | 8/1975 | Boden et al. | 222/134 |
| 4,170,253 | A | * | 10/1979 | McArthur | 141/362 |
| 4,242,940 | A | * | 1/1981 | Page | 91/277 |
| 4,771,726 | A | * | 9/1988 | Fitch, Jr. | 118/25 |
| 5,088,631 | A | * | 2/1992 | Torterotot | 222/389 |
| 5,407,102 | A | * | 4/1995 | Freudinger et al. | 222/309 |
| 6,056,155 | A | * | 5/2000 | Byerly et al. | 222/1 |

* cited by examiner

*Primary Examiner*—Lien M. Ngo
(74) *Attorney, Agent, or Firm*—Jones Day

(57) ABSTRACT

A pump apparatus for an adjustable metering and dispensing pump apparatus for food products including a product piston moving in a product cylinder, the product cylinder being connected to a food hopper and a dispensing nozzle. The pump apparatus also includes a cylindrical valve moving within a central aperture in the product piston to selectively open and close passageways also in the product piston which communicate with intake and outlet ports connected to the product cylinder. The valve is attached to a valve piston moving within a valve piston cylinder and the valve piston cylinder is attached to a source of compressed air, to a sensor and to a control assembly. The control in turn is connected to a foot switch to allow an operator to initiate a cycle of the pump apparatus. The valve piston reciprocates both the valve piston and the product piston, however, while the valve moves directly with the valve piston, the product piston is connected with a lateral pin mounted in an elongated lateral slot formed in the product piston resulting in a delayed movement of the product piston. A screw is mounted to the valve piston cylinder to abut the valve piston in an adjustable manner so that the valve piston stroke is changeable resulting in a corresponding change in the volume of a food product in a product chamber in the product cylinder.

19 Claims, 9 Drawing Sheets

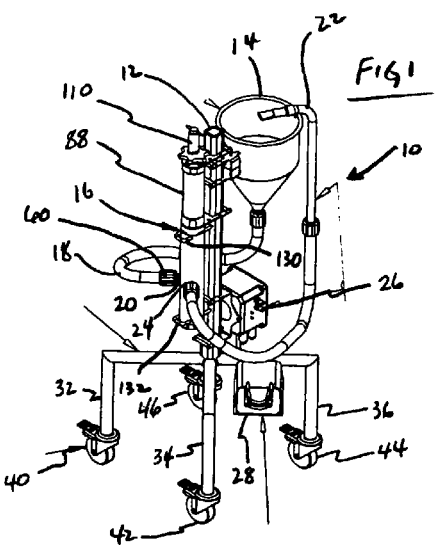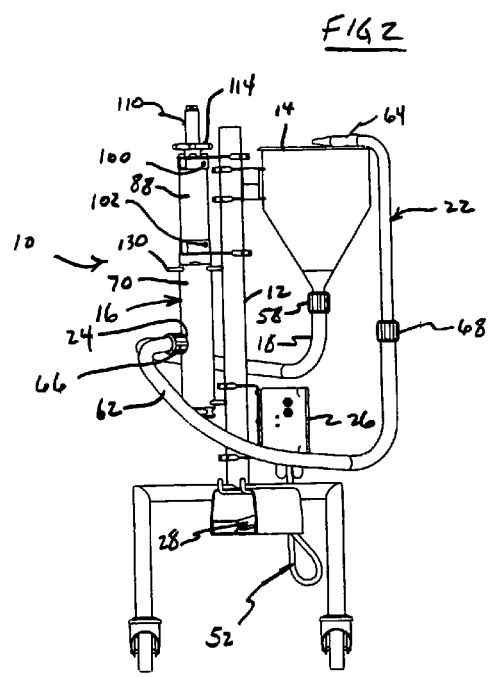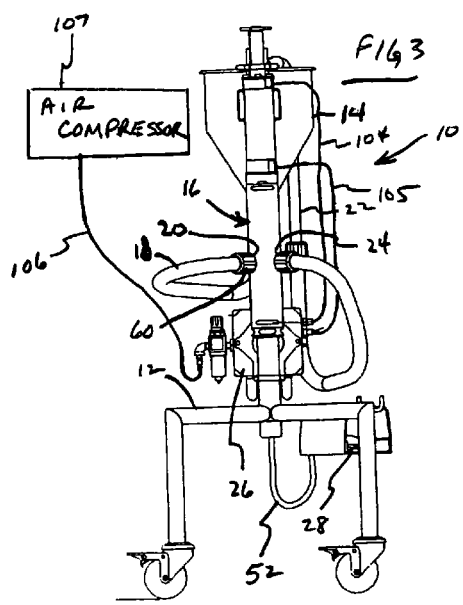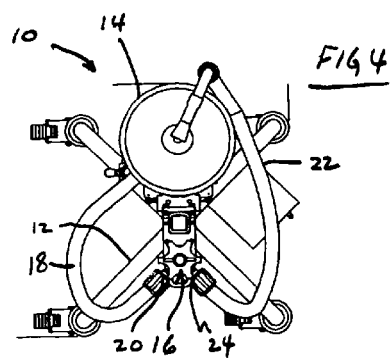

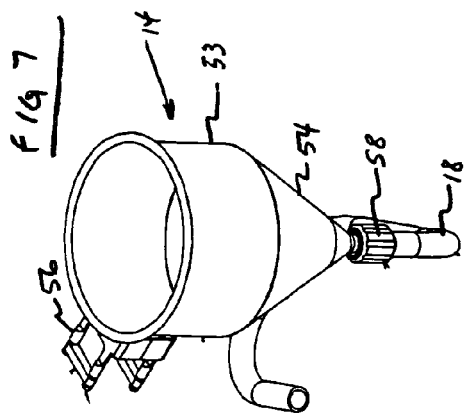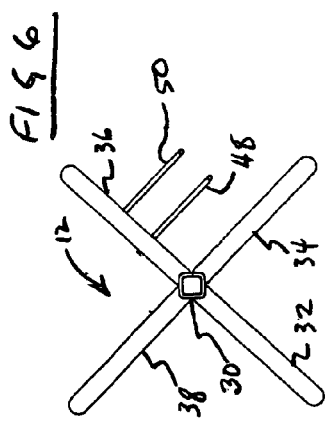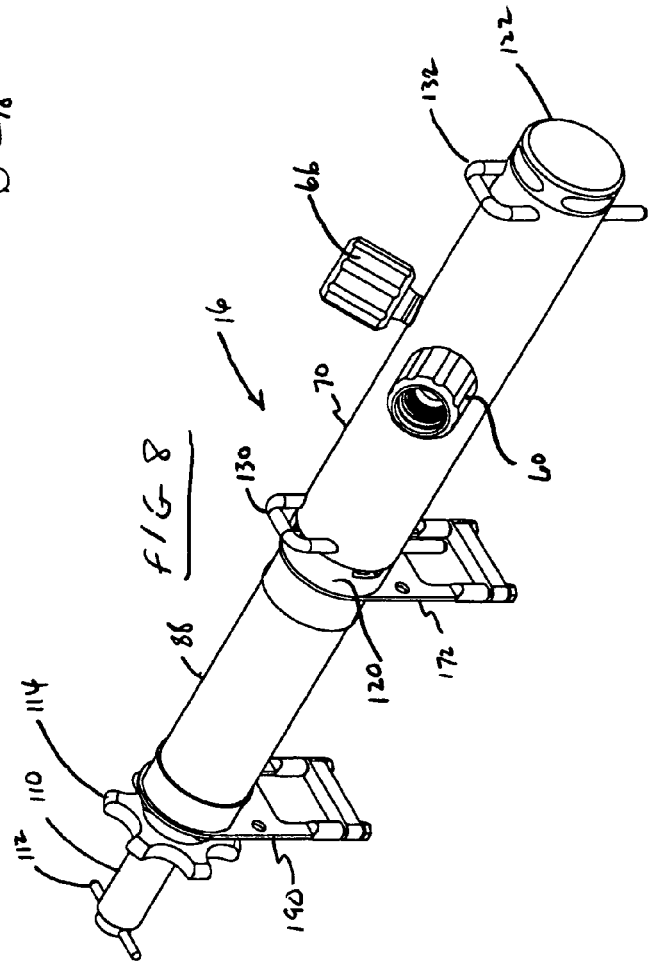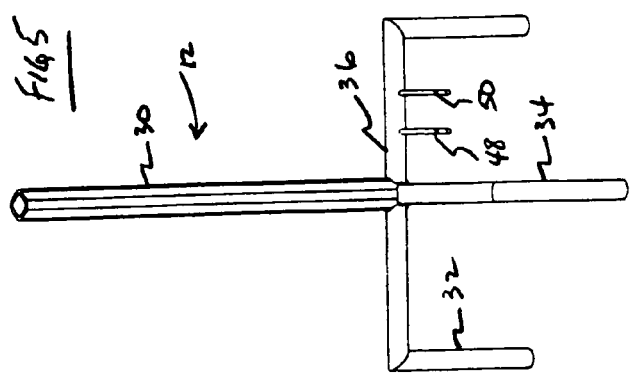

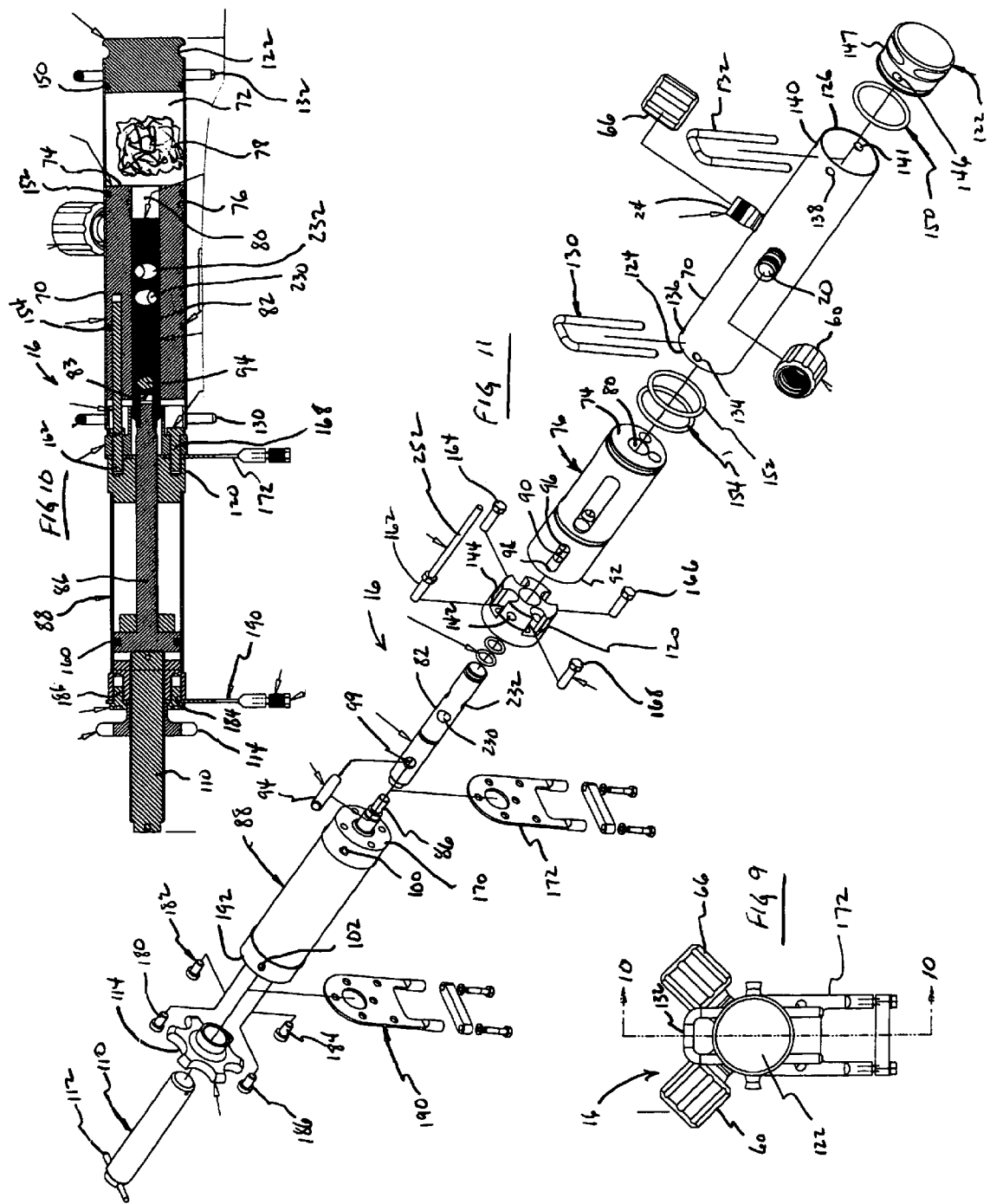

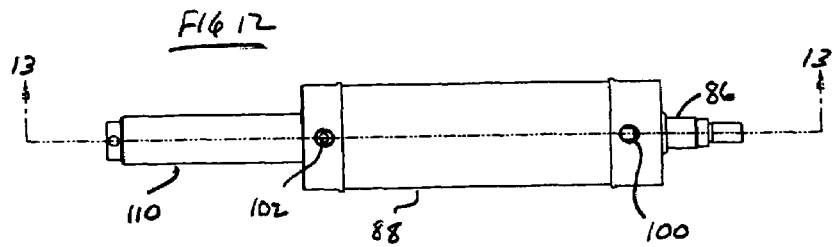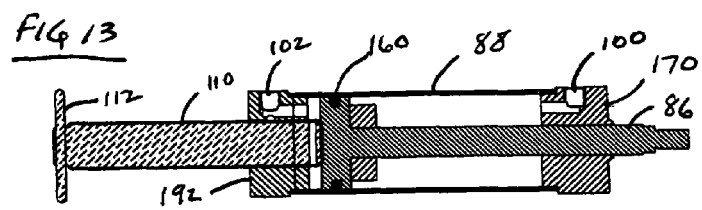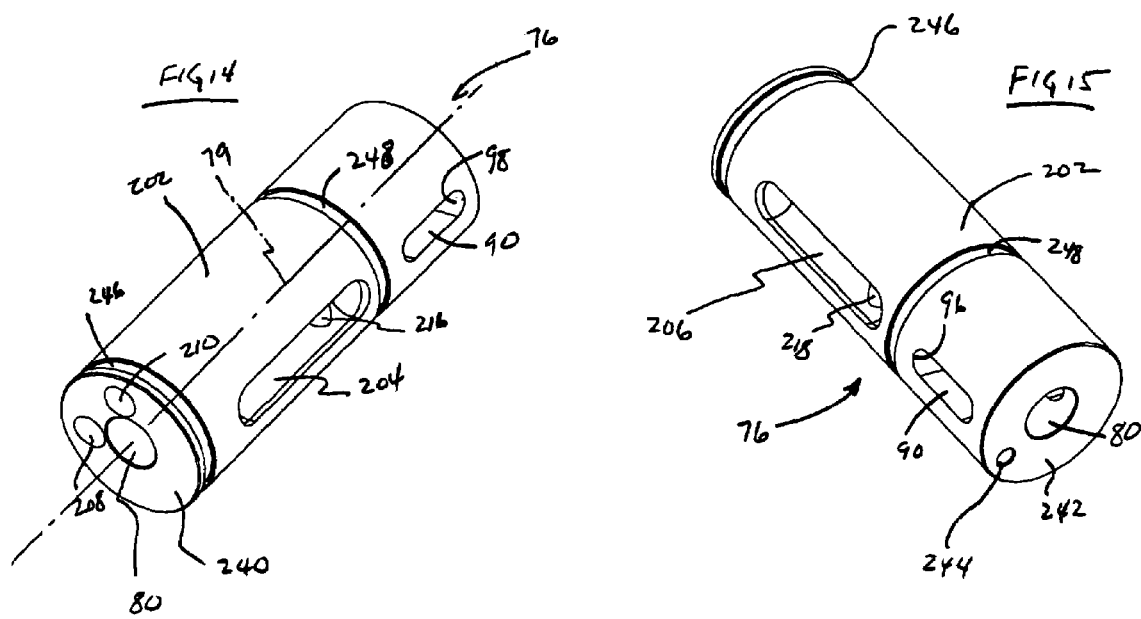

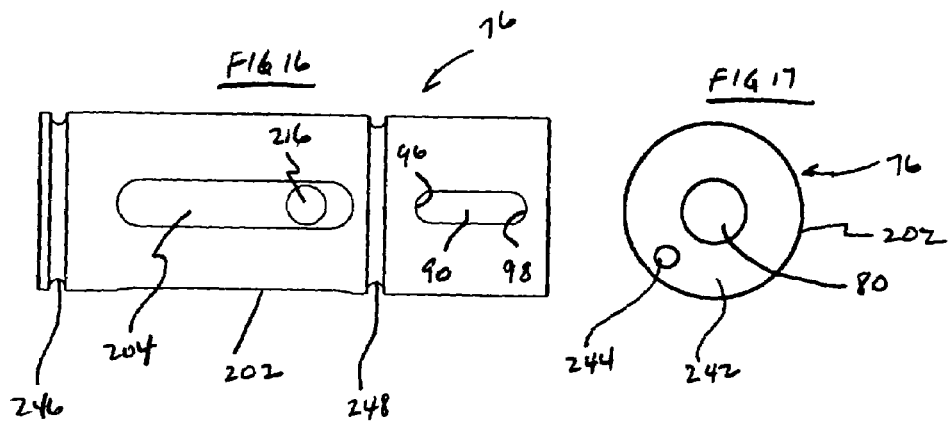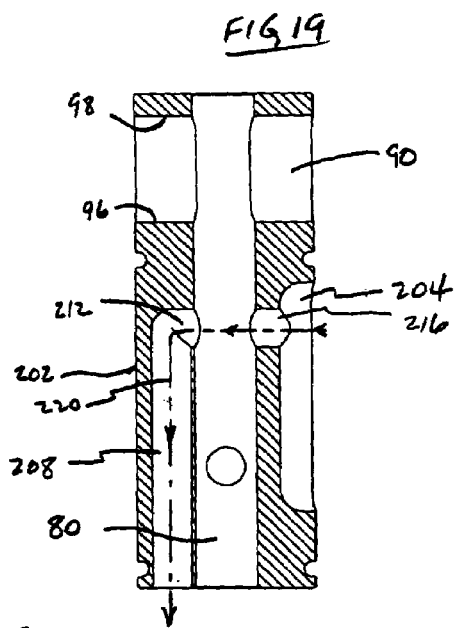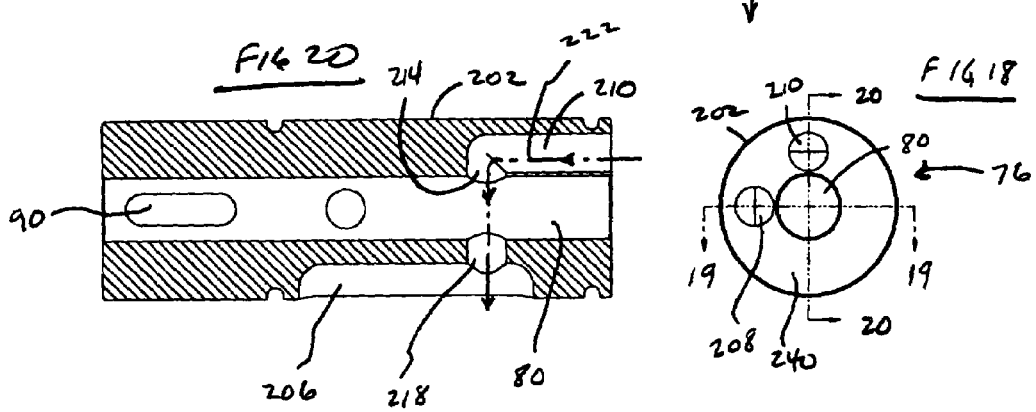

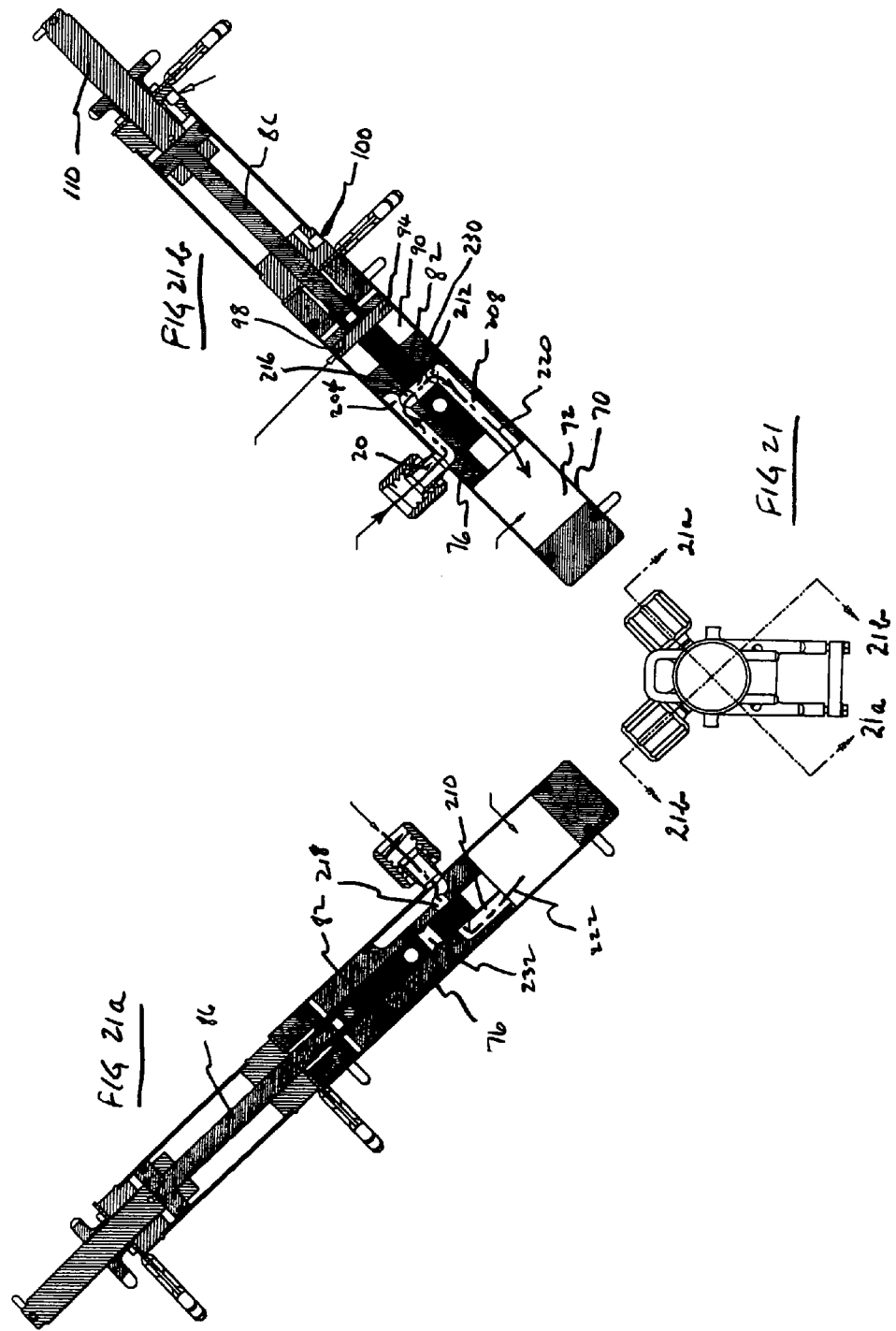

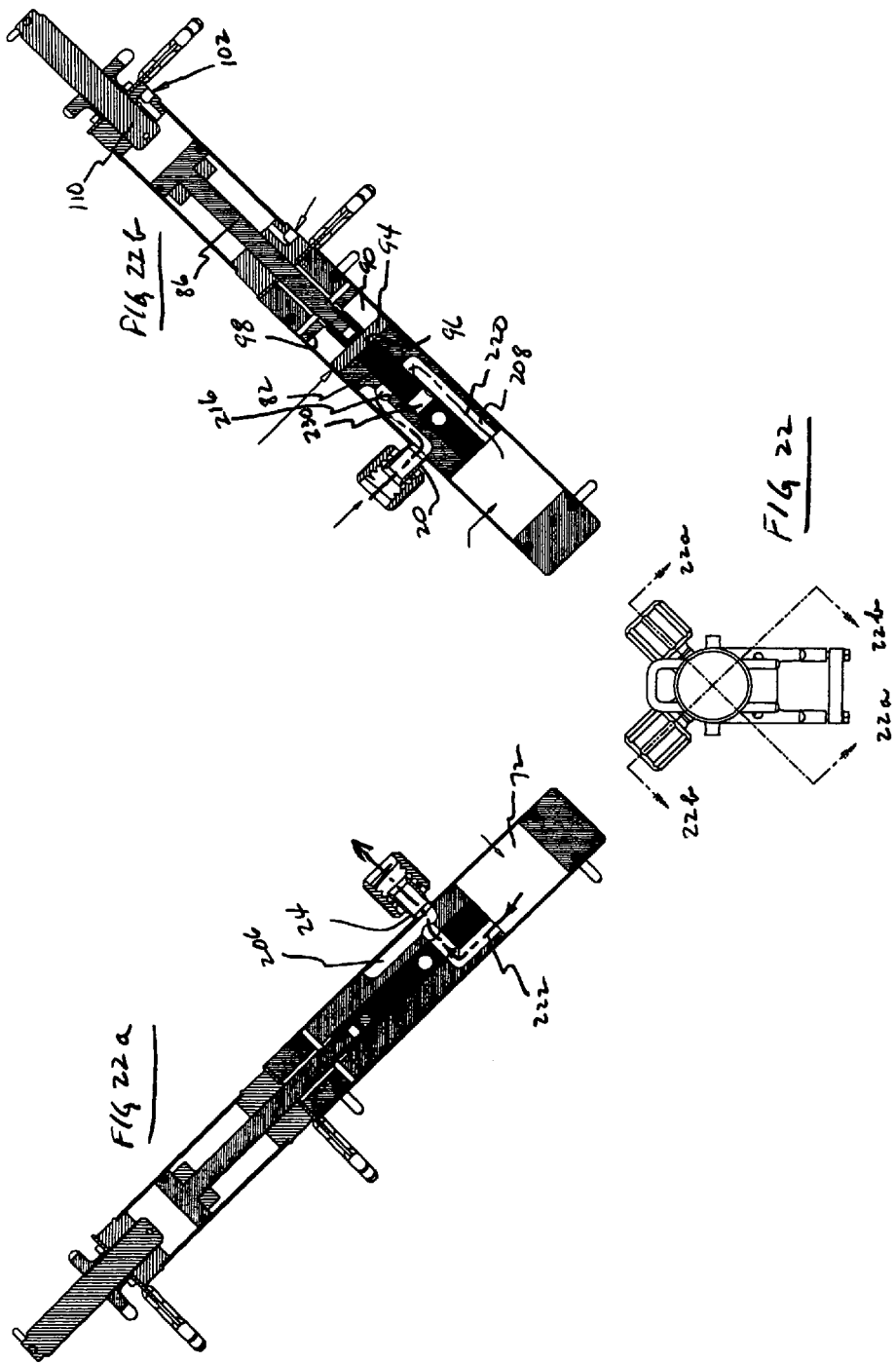

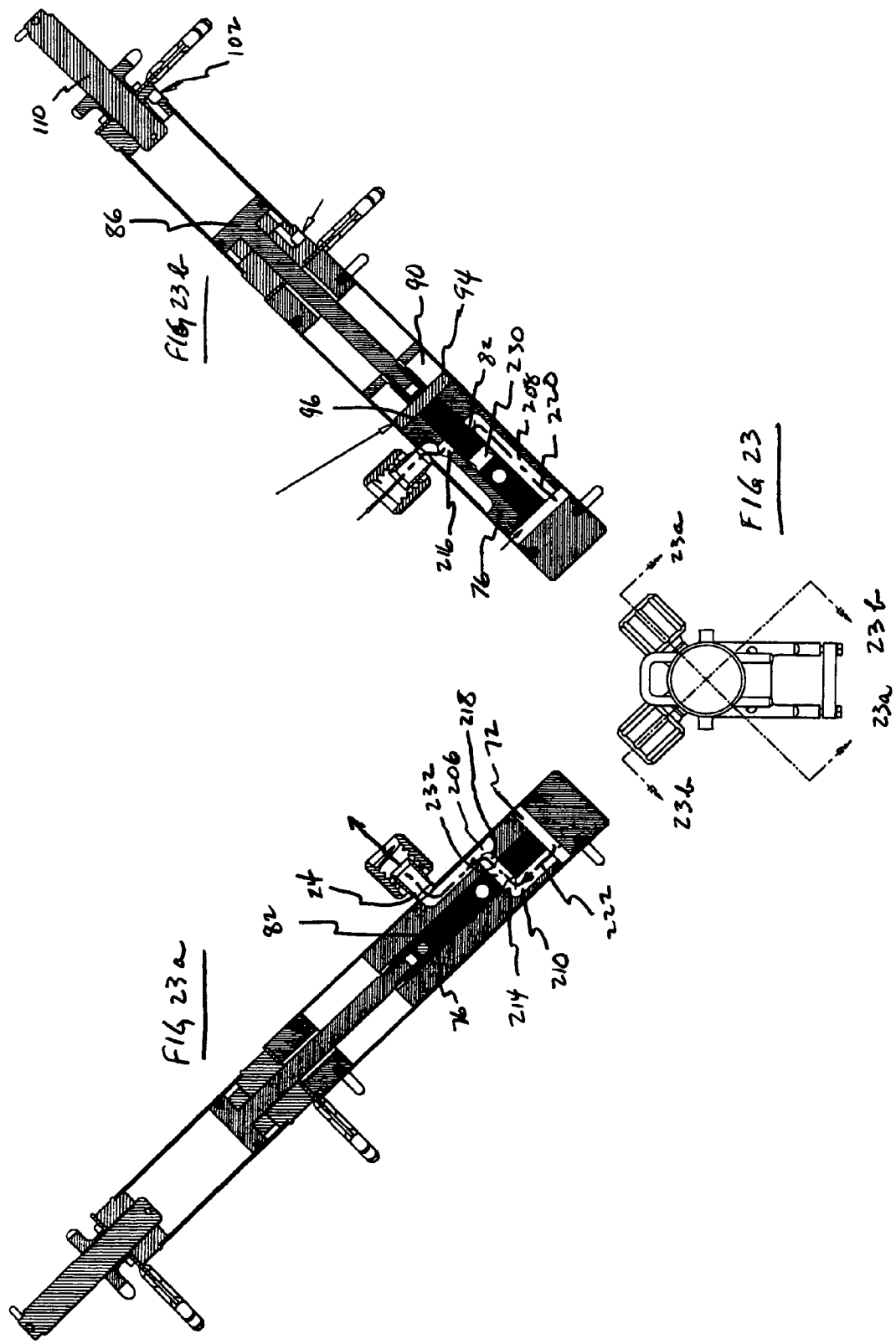

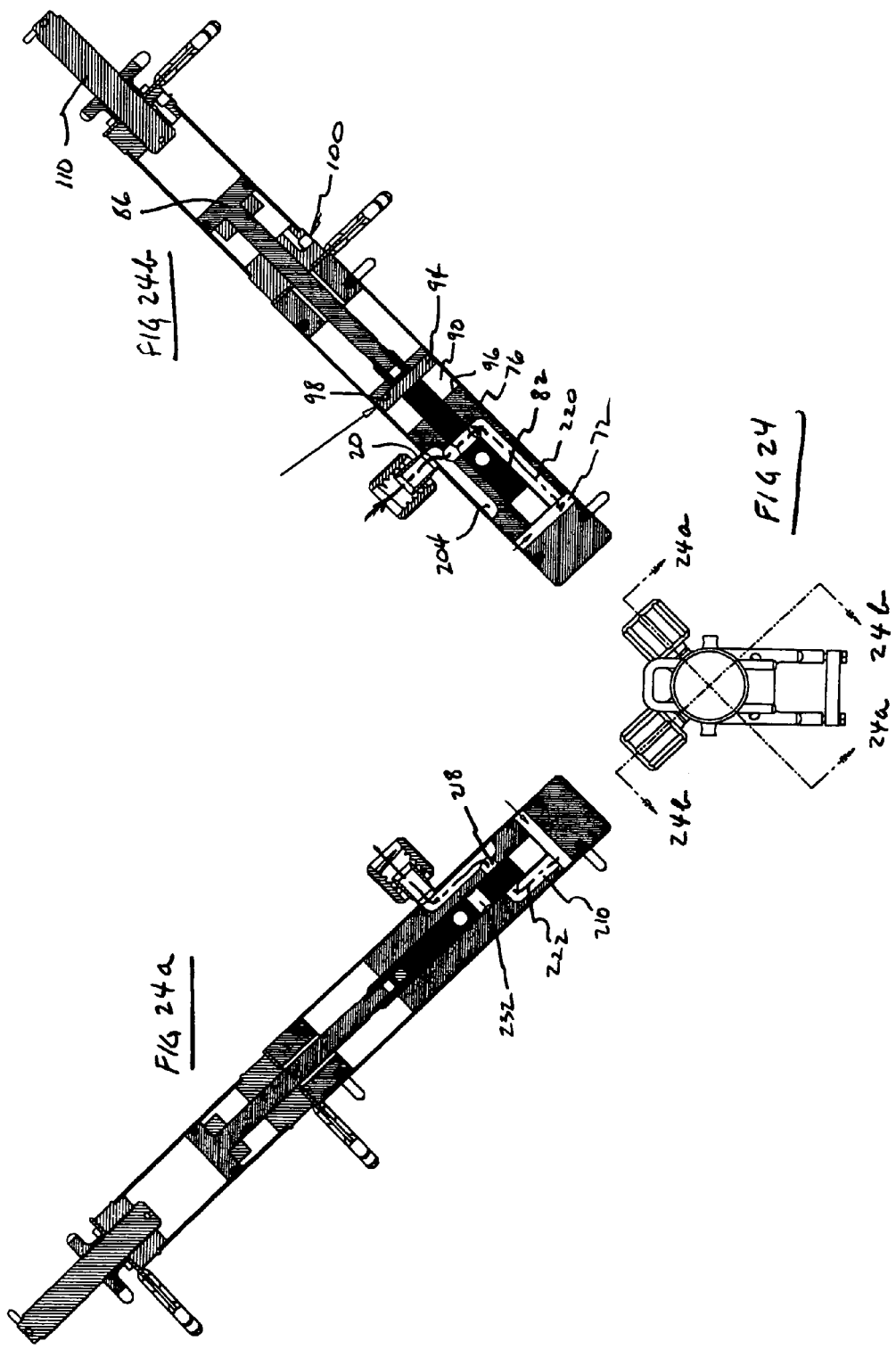

FOOD METERING AND DISPENSING DEVICE

CROSS REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to a pump apparatus and more particularly to a pump apparatus having a valve within a piston for a metering and dispensing device that may be used for food products, the device being very efficient, reliable and simply constructed as well as easy to use and to wash.

2. Description of the Related Art

Dispensers for food products are known in the food industry. For example, a dispenser for barbecue sauce is constructed with a piston in a cylinder, an intake check valve and an outlet check valve. A major problem with this dispenser is that the food product being transmitted includes chunks which clog the check valves and require frequent cleaning. This procedure is very time consuming and thus the dispenser is not practical.

BRIEF SUMMARY OF THE INVENTION

The difficulties encountered with previous dispensers has been overcome by the present invention. What is described here is a pump apparatus including a cylinder for containing a piston and for forming a product chamber, the cylinder having a longitudinal axis, an inlet and an outlet, a piston mounted in the cylinder, the piston having first, second and third apertures, a valve mounted in one of the piston apertures and having first, second and third lateral apertures and a connecting structure which allows both the piston and the valve to reciprocate together and allows the valve to move while the piston is stationary.

There are a number of advantages, features and objects achieved with the present invention which are believed not be available in earlier related devices. For example, several advantages are that the pump apparatus is a simply constructed, reliable, efficient and cost effective. Other features are that the pump apparatus is easy to operate, easy to maintain and easy to clean.

A more complete understanding of the present invention and other objects, advantages and features thereof will be gained from a consideration of the present description which provides a written description of the invention, and of the manner and process of making and using the invention, set forth in such full, clear, concise, and exact terms as to enable any person skilled in the art to which it pertains, or with which it is most nearly connected, to make and use the same in compliance with Title 35 U.S.C. section 112 (first paragraph). Furthermore, the following description of a preferred embodiment of the invention read in conjunction with the accompanying drawing provided herein represents an example of the invention in compliance with Title 35 U.S.C. section 112 (first paragraph), but the invention itself is defined in the attached Claims section attached hereto.

BRIEF DESCRIPTION OF THE SEVERAL VIEWS OF THE DRAWING

FIG. 1 is an isometric view of a metering and dispensing device for a food product, the device including a pump apparatus exemplifying the present invention.

FIG. 2 is a front elevation view of the metering and dispensing apparatus.

FIG. 3 is a side elevation view of the metering and dispensing apparatus and diagrammatically, an air compressor.

FIG. 4 is a top plan view of the metering and dispensing apparatus.

FIG. 5 is an isometric view of a mounting frame of the metering and dispensing apparatus.

FIG. 6 is a top plan view of the mounting frame of the metering and dispensing apparatus.

FIG. 7 is an isometric view of a hopper and a tube of the metering and dispensing apparatus.

FIG. 8 is an isometric view of a pump assembly of the metering and dispensing apparatus.

FIG. 9 is an end view of the pump assembly of the metering and dispensing apparatus.

FIG. 10 is a sectional elevation view taken along line 10-10 of FIG. 9 and illustrating the pump apparatus including a cylinder, a piston and a valve within the piston.

FIG. 11 is an exploded isometric view of the pump assembly of the metering and dispensing apparatus.

FIG. 12 is an elevation view of a valve cylinder, a valve piston and an adjustment screw of the pump assembly.

FIG. 13 is a section view taken along line 13-13 of FIG. 12.

FIG. 14 is an enlarged, front isometric view of a product piston of the pump apparatus of the pump assembly.

FIG. 15 is a rear isometric view of the product piston.

FIG. 16 if an elevation view of the product piston.

FIG. 17 is a rear end view of the product piston.

FIG. 18 is a front end view of the product piston.

FIG. 19 is a section view taken along line 19-19 of FIG. 18.

FIG. 20 is a section view taken along line 20-20 of FIG. 18.

FIGS. 21, 21a and 21b are a second end view of the pump assembly and two section views taken along lines 21a-21a and 21b-21b of the second end view at the start of a dispensing cycle.

FIGS. 22, 22a and 22b are a third end view of the pump assembly and two section views taken along lines 22a-22a and 22b-22b of the third end view at a second stage of the cycle.

FIGS. 23, 23a and 23b are a fourth end view of the pump assembly and two section views taken along lines 23a-23a and 23b-23b of the fourth end view at a third stage of the cycle.

FIGS. 24, 24a and 24b are a fifth end view of the pump assembly and two section views taken along lines 24a-24a and 24b-24b of the fifth end view at a fourth stage of the cycle.

DETAILED DESCRIPTION OF A PREFERRED EMBODIMENT OF THE INVENTION

While the present invention is open to various modifications and alternative constructions, the preferred embodiment illustrating the best mode contemplated by the inventor of carrying out his invention is shown in the various figures of the drawing and will be described herein in detail pursuant to Title 35 U.S.C. section 112 (first paragraph). It is understood, however, that there is no intention to limit the invention to the particular embodiment, form or example which is disclosed herein. To the contrary, the intention is to cover all modifications, equivalent structures and methods, and alternative constructions falling within the spirit and scope of the invention as expressed in the appended Claims section attached hereto, pursuant to Title 35 U.S.C. section 112 (second paragraph).

Referring now to FIGS. 1-4, there is illustrated a food metering and dispensing device 10 having a mounting frame 12, a food hopper 14 connected to the frame, an adjustable metering pump assembly 16 mounted to the frame, a tube or hose 18 connecting an inlet port 20 of the pump assembly 16 to the hopper 14, a nozzle assembly 22 connected to an outlet port 24 of the pump assembly 16, a control assembly 26 mounted to the frame for operating the pump assembly in a predetermined manner and a pneumatic foot switch 28 for starting a cycle of the pump assembly. The apparatus 10, as shown, is a mobile unit intended to dispense a food product, such as tomato sauce for a pizza topping, either at non periodic intervals, if the pizza is made only after an order is received, or as part of an assembly line if packaged pizzas are being prepared.

The frame 12 includes an upstanding post 30, FIGS. 5 and 6, supported by four legs 32, 34, 36, 38 mounted to four casters 40, 42, 44, 46, FIG. 1. Extending from one of the legs 36 is a pair of hooks 48, 50, FIGS. 5 and 6, that is used to store the foot switch 28, FIG. 1, when the apparatus is not in use. A pneumatic line 52, FIGS. 2 and 3, extends from the foot switch to the control assembly 26 for transmitting a signal from the foot switch.

It is to be understood that a wall switch (not shown) may be substituted for the foot switch or the apparatus may operate automatically, for example, as part of an assembly line by connecting the device (without the foot switch) to a sensor (not shown) so that a signal is generated every time a pizza presents itself at a selected location. In such circumstances, the casters may be removed, if desired. Or, the casters may be retained because they may be convenient for moving the device to a washing station. Because food is being processed by the device, all parts of the device coming into contact with the food product must be detached and/or disassembled, usually once a day, for washing in a prescribed manner well know to those skilled in the food preparation field.

The food hopper 14, FIG. 7, includes a cylindrical upper portion 53 and a cone shaped lower portion 54. The lower portion is connected to the tube 18. A bracket 56 is fastened to the hopper and is used to mount the hopper to the frame 12. A hose lock nut 58 connects the tube to the hopper and provides an easy and quick mechanism to remove the tube from the hopper to allow both to be washed. The other end of the tube 18 is connected to the inlet port 20, FIGS. 2-4, of the pump assembly 16. Another hose lock nut 60, FIG. 3, is provided so that the tube may be easily and completely disconnected and washed.

Attached to the outlet port 24 of the pump assembly is the nozzle assembly 22. The nozzle assembly includes a second or outlet tube or hose 62, FIG. 2, and an end piece 64. When in use, the end piece is placed above a food substrate, such as a pizza crust, the pump assembly activated, and the food product, in this case, tomato sauce, is applied to the pizza crust. A hose lock nut 66 is used to connect the outlet tube 62 to the outlet port 24 of the pump assembly 16. Another hose lock nut 68 is used to connect the end piece 64 to the tube 62.

Referring now to FIGS. 8-13, the adjustable metering pump assembly 16 is shown in more detail. The pump assembly includes a pump apparatus, itself including a product cylinder 70 for forming a product chamber 72 between its inner surface and a top surface 74 of a product piston 76. A shaded region 78 symbolizes a food product in the product chamber. The product piston has a longitudinal axis 79, FIG. 14, and includes a longitudinally directed, centrally located internal aperture or opening 80. The pump apparatus includes a cylindrically shaped valve 82 with a threaded opening 83, the valve being located to move longitudinally in a reciprocal fashion in the opening 80 of the product piston. A valve piston 86 threadedly secured to the valve is mounted in a valve piston cylinder 88 and provides structure to move the valve 82 in the reciprocal motion in the product piston central opening 80.

The product piston has a lateral aperture or slot 90 formed at an end portion 92 of the product piston. A connecting structure in the form of a pin 94 is mounted laterally in the lateral slot 90, and causes the product piston to be reciprocated in the product cylinder 70. The lateral slot 90 is partially formed by first and second end surfaces 96, 98 spaced apart in a longitudinal direction of the product piston, and the lateral pin 94 moves between the first and the second end surfaces. The lateral pin 94 is also connected to the valve 82 through a first lateral aperture 99 formed in the valve. This structural arrangement allows the valve being moved by the valve piston 86 to reciprocate relative to the product piston, and the product piston to reciprocate relative to the product cylinder, but the product piston's movement occurs only after the lateral pin engages one or the other of the slot end surfaces 96, 98. During the time that the lateral pin is traveling with the valve and between the end surfaces of the slot 90, the product piston is stationary even though the valve 82 within the product piston continues to move.

The valve piston 86 reciprocates in the valve piston cylinder 88 in response to a fluid, usually air or water, though preferably air, either entering a first port 100 to cause a food product intake or entering a second port 102 to cause a food product evacuation. The valve piston is directly connected to the valve 82, and, through the lateral pin 94, the valve aperture 99 and the lateral slot 90, to the product piston 76. Appropriate tubes 104, 105, FIG. 3, are attached to the fluid ports 100, 102 and a tube 106 is attached to a source of fluid, such as an air compressor 107. A sensor is included in the control assembly to sense when the valve piston reaches the end of a stroke and to signal the control assembly to send air to the opposite side of the valve piston so as to reverse direction.

A screw 110, a gripping pin 112 and a lock knob 114 is used to adjust the stroke of the valve piston 86. The screw abuts the valve piston at the end of its intake stroke for causing the valve piston to have a shorter or a longer stroke, as desired. This mechanism allows the selective shortening and lengthening of the stroke of the product piston 76 and thereby adjusts the volume, less or more, of the product chamber 72. It is understood that other structures may be used to adjust the stroke of the product piston.

It may now be observed that the valve piston 86, the valve cylinder 88 and the screw 110 do not ordinarily come into contact with food product and so they form a sealed unit that may be cleaned on the outside but there is usually no need to disassemble the unit. Once the screw position is set, the lock knob 114 is used to restrain the screw from inadvertently changing positions and thereby changing the volume of the product chamber. It is now understood that an operator has a simple and easily manipulated structure to quickly adjust the volume of the product chamber and assure that the volume will remain constant.

The product cylinder 70 has a tubular shape and is covered by two end caps, a mid end cap 120 and a far end cap 122, mounted at respective product cylinder ends 124, 126. U-shaped connector pins 130, 132 are used to attach the end caps to the product cylinder through appropriate openings, such as the openings 134, 136, 138, 140, 141 in the product cylinder, and aligning openings 142, 144, 146, 147 in the end caps. Fixed to the cylinder are the intake port 20 and the outlet port 24 which are connected by the hose lock nuts 60, 66 to the tubes 18 and 62, respectively.

O-ring seals 150, 152, 154 are provided around the far end cap 122 and the product piston 76. Another o-ring seal 160 is provided for the valve piston 86. A set of screws 162, 164, 166, 168 are used to attach the mid end cap 120 to one end 170 of the valve cylinder 88 and to a bracket 172. Another set of screws 180 182, 184, 186 is used to connect another bracket 190 at the other end 192 of the valve cylinder. It should be noted that by simply removing the U-shaped pins 130, 132 and unscrewing the hose lock nuts 60, 66 the pump elements in contact with food product, such as the product cylinder 70, the far end cap 122 and the product piston 76 are separable from the rest of the pump assembly for washing.

The product piston 76 is described in detail in FIGS. 14-20. The product piston has a cylindrical shape with the first centrally located, longitudinally directed, internal aperture 80 and an outer circumferential surface 202. Two longitudinally directed apertures or grooves 204, 206 are formed in the outer surface 202. The product piston also includes second and third longitudinally directed, but off-center, internal apertures 208, 210 spaced from each other and from the first internal aperture 80 although they are in communication with the first internal aperture by lateral portions 212, 214, see FIGS. 14, 15, 19 and 20.

The product piston further includes two lateral internal apertures 216, 218, each in communication with one of the second and third longitudinally directed internal aperture 208, 210 and with one of the grooves 204, 206 as well as with the first longitudinally directed internal aperture 208. The two lateral apertures 216, 218 are spaced from each other in a longitudinal direction and they are radially offset from one another as well by about ninety degrees, see FIGS. 14, 15, 19 and 20. The grooves 204, 206 are also offset by about ninety degrees as are the second and third internal apertures 208, 210, see FIG. 18.

It is now appreciated that two passageways are formed in the product piston, first an intake passageway represented by the arrows 220, FIG. 19, and including the groove 204, the lateral aperture 216, across the first central aperture 80, into the lateral portion 212 and the second aperture 208. The second or outlet passageway represented by the arrows 222, FIG. 20, includes the third aperture 210 and the lateral portion 214, across the first central aperture 80, into the lateral aperture 218 and along the groove 206.

The passageways are completed by product paths or lateral apertures 230, 232, FIGS. 10 and 11, in the valve 82. The two lateral valve apertures 230, 232 are spaced from one another in a longitudinal direction and are also offset from one another by about ninety degrees, see FIGS. 21a and 21b. The valve moves back and forth in the central internal aperture 80 of the product piston 76, and the second aperture 230 of the valve during intake aligns as will be explained below, with the intake passageway 220. During evacuation, the second aperture misaligns with the intake passageway.

When the second lateral aperture 230 of the valve is in alignment with the intake passageway 220, the second aperture 230 is adjacent to the lateral aperture 216 and to the lateral portion 212 of the product piston 76. When the lateral aperture 230 of the valve is misaligned with the intake passageway 212, the valve is in a transition movement or the other third lateral aperture 232 of the valve is aligned with the outlet passageway 222 where the third lateral aperture 232 is adjacent to and aligned with the lateral aperture 218 and the internal portion 214 of the product piston 76. The third lateral aperture 232 operates in a similar though opposite manner from the second lateral aperture 230 as will be explained in relation to FIGS. 21-24.

The product piston also has a front end surface 240, a rear end surface 242, an anti-rotation opening 244 in the rear surface, and two circumferentially directed grooves 246, 248 in the outer surface 202 for receiving the two o-ring seals 152, 154. The product piston further includes the lateral slot 90 for receiving the lateral pin 94. The valve 82 also has the first lateral aperture 99 for also receiving the lateral pin 94. In this manner, the force causing movement of the valve piston 86 is transmitted to the valve 82, from the valve to the lateral pin 94, and from the lateral pin to the product piston 76, except for the delay of motion caused by the free movement of the lateral pin 94 in the elongated lateral slot 90 of the product piston. It is not until the lateral pin moves into contact and abuts either the end surface 96 or the end surface 98 around the lateral slot that the product piston also is moved in the same direction and at the same rate as the valve piston, the valve and the lateral pin. An anti-rotation pin 252, FIG. 11, is connected to or integral with the screw 162 and is inserted into the opening 244 of the product piston to prevent rotation of and to align the product piston.

Because of contact with food product, the material of the product cylinder, the product piston, the valve, the lateral pin, the far end cap, the U-shaped pins, the tubes, and the hopper are made of stainless steel or plastic, such as the plastic sold under the brand DELRIN.

The control assembly 26 is operated by the foot switch 28 and is used to start a pump cycle of the adjustable metering pump assembly 16. The control assembly receives a signal from the foot switch and activates the control assembly to send compressed air to one side of the valve piston cylinder to cause retraction of the valve piston. First, food product in the product cylinder is expelled. When the valve piston reaches its extended position, the sensor, which monitors air escaping from the air port not being supplied by the compressor, signals the control assembly to reverse the air flow from one side of the valve piston to the other. The valve piston retracts as does the product piston and a suction or low pressure is created in the now expanding product chamber 72. This causes a movement of food product situated in the hopper at atmospheric pressure to flow through the tube 18 to the intake port 20 of the pump assembly and along the intake passageway 220. The position of the screw 110 determines how far back or how far the retraction of the valve piston goes. The volume of the product chamber 72 is thus filled with food product, and a cycle is completed. When the operator activates the foot switch again, a new cycle begins. The control assembly then causes air to be injected to the other side of the valve piston to cause a compression stroke of the product piston 76. This forces the food product to move along the outlet passageway 222, through the outlet port 24, along the tube 62 and to eject through the end piece 64 of the nozzle assembly 22.

The operation of the pump assembly is illustrated in FIGS. 21-24, where each page of figures shows an end view of the pump assembly, in the lower center of the page and is designated FIGS. 21, 22, 23 and 24, and two section views, disposed at forty-five degree angles, taken from the end views, each section at an offset of ninety degrees from the other, and are designated FIGS. 21*a*, 21*b*, 22*a*, 22*b*, 23*a*, 23*b*, 24*a* and 24*b*. The cycle of the pump assembly begins with the valve piston 86, the valve 82, and the product piston 76, at their most retracted positions as shown in FIGS. 21*a* and 21*b*.

Referring to FIGS. 21*a* and 21*b*, air has already entered the port 100, FIG. 21*b*, so as to push the valve piston 86 to an abutting position against the screw 110. The valve is positioned such that the intake passageway 220 is open allowing food product to be sucked through the intake port 20 as the product piston was retracted. The food product has moved along the groove 204, the lateral aperture 216, the second valve aperture 230, the lateral portion 212 and through the second longitudinal aperture 208 so as to discharge into the product chamber 72 in the product cylinder 70.

In the FIG. 21*b* configuration of the pump assembly, the product chamber should be full of food product. The lateral pin 94 is positioned abutting the end wall 98 of the lateral slot 90 of the product piston. As can be seen in FIG. 21*a*, the outlet passageway 222 is closed because the third lateral aperture 232 of the valve is not aligned with either the third longitudinal aperture 210 or the lateral aperture 218 in the product piston.

Referring now to FIG. 22*b*, the cycle continues by having air enter the port 102. This pushes the valve piston 86 away from the screw 110. The valve 82 is moved to a position such that the outlet passageway 222, FIG. 22*a*, is opened so that food product in the product chamber 72 is ready to be pushed through the outlet port 24. In the FIG. 22*b* configuration of the pump assembly, the product chamber is still full of food product. The lateral pin 94 has moved away from the end wall 98 of the lateral slot 90 of the product piston and has approached the end wall 96. However, as can be seen, the product piston has not yet moved from its position in FIG. 21*b*.

The length in the longitudinal direction of the lateral slot 90 of the product piston between the end walls 96 and 98 has allowed the lateral pin to move freely in relation to the product piston. Nevertheless, the intake passage way 220 has been closed because the second lateral aperture 230 of the valve is no longer in alignment with either of the second longitudinal aperture 208 or the lateral aperture 216 in the product piston.

Moving on to FIGS. 23*a* and 23*b*, the cycle continues by having air at a pressure above ambient continue to enter the port 102, so as to push the valve piston 86 to a position furthest from the screw 110. The valve 82 is in a position such that the outlet passageway 222 is still open because of the longitudinal length of the groove 206. In FIG. 22*a*, the groove 206 is at one end of its travel and in FIG. 23*a*, the groove 206 is at the other end of its travel. During the whole time that the groove 206 travels, it remains in an open alignment with the outlet port 24.

Also during this travel time, the product piston moves to compress the product chamber 72 so that food product is pushed out through the outlet port 24. To accomplish this, the food product is pushed through the third longitudinal aperture 210, into the lateral portion 214, through the third lateral aperture 232 of the valve, into the lateral aperture 218 and along the groove 206 so as to be discharged through the outlet port 24. The lateral pin 94, FIG. 23*b*, is positioned abutting the end wall 96 of the lateral slot 90 of the product piston. As may be seen in FIG. 23*b*, the intake passageway 220 remains closed because the second lateral aperture 230 of the valve is not aligned with either the second longitudinal aperture 208 or the lateral aperture 216 in the product piston.

Finally, moving on to FIG. 24*b*, the cycle continues by having higher pressure air enter the port 100, so as to push the valve piston 86 toward the screw 110. The valve 82 is moved to a position such that the intake passageway 220 is opened. This allows food product to be sucked through the intake port 20 as the product piston retracts. In the FIG. 24*b* configuration of the pump assembly, the product chamber 72 is essentially empty of food product although food product is about to enter. The selected portion of food product previously in the chamber has already been dispensed. It should be noted that the lateral pin 94 has moved away from the end wall 96 of the lateral slot 90 of the product piston and has approached the opposite end wall 98.

As can be seen, even though the valve and the valve piston have moved from the FIG. 23*b* positions, the product piston 76 is still stationary and has not yet moved from its position in FIG. 23*b* because of the free travel of the lateral pin 94 in the lateral slot 90. Also, because of the longitudinal length of the groove 204, it always remains in open communication with the inlet port 20, just as the groove 206 always stays in open communication with the outlet port 24, as the product piston moves from the configuration in FIG. 24*b* to the configuration in FIG. 21*b*. The outlet passageway 222, however, has been closed because the third lateral aperture 232 of the valve is no longer in alignment with either the longitudinal aperture 210 or the lateral aperture 218 in the product piston.

The stroke of the product piston may be three inches to provide about ten ounces of tomato sauce and the longitudinal distance of the grooves 204, 206 may be about one and a half inches.

The pump apparatus comprising the valve, the product piston and the pin are simply constructed, reliable and relatively inexpensive. In fact, the entire metering and dispensing device is simply constructed, reliable and efficient and is a cost effective device for metering and dispensing a food product. The device is also easy to operate, easy to maintain and east to clean. The pump apparatus can operate with food product that typically measures in the range of three to twelve on a Bostwick Consistometer. The pump apparatus can also be used to pump non-food product and product outside the above Bostwick range and even product that cannot be measured by the Bostwick Consistometer.

The above specification describes in detail the preferred embodiment of the present invention. Other examples, embodiments, modifications and variations will, under both the literal claim language and the doctrine of equivalents, come within the scope of the invention defined by the appended claims. For example, changing the size or placement of the valve, or of the valve piston, or of the product piston or the structure of the hopper or of the frame are still considered to be equivalent structures. Further, they will come within the literal language of the attached Claims. Using water or any other fluid instead of air to drive the valve piston or using different hoses are still considered equivalent structures. Also, a compressor may be incorporated in the control assembly should the user not have a central compressed air supply readily available. Or, a mechanical actuator operated by a small electrical motor may move the product piston back and forth and the control assembly would have an electric circuit. The pump assembly may also be operated manually by using a handle or a lever or similar element. In addition, it should be noted that the lateral apertures 230, 232 may be replaced with circumferential grooves spaced from one another in an axial or longitudinal direction, rather than through-holes as shown and explained above. It is intended that the term "aperture" used here covers both through-holes and grooves as well as equivalent structures because all that is required is selective product paths through or around the valve so that product moving through the product piston goes from the inlet to the product chamber and from the chamber to the outlet. The use of a pin 94 in the aperture 99 of the valve and the slot 90 of the product piston may be replaced with shoulders and/or washers or other mechanisms to provide for the delaying movement of the product piston while being driven by the reciprocating movement of the valve. By way of another example, the valve may be elongated to extend into the product chamber. A snap ring around the valve at the extended end and another snap ring or shoulder near the other end of the valve which are engageable with surfaces of the product piston may be used to allow both free travel of the valve without travel of the product piston and combined travel of both the valve and the product piston. Using different attachment mechanisms for the brackets or different pin designs also are considered equivalent. Still other alternatives will also be equivalent as will many new technologies. There is no desire or intention here to limit in any way the application of the doctrine of equivalents nor to limit or restrict the scope of the invention.

The invention claimed is:

1. A pump apparatus comprising:
   a cylinder for containing a piston and for forming a product chamber, said cylinder having a longitudinal axis, an inlet for receiving a product into said product chamber and an outlet for allowing said product chamber to be evacuated;
   a piston mounted in said cylinder and movable in a direction parallel to the longitudinal axis, said piston having a first longitudinally directed internal aperture, a second longitudinally directed internal aperture spaced from said first longitudinally directed internal aperture, a third longitudinally directed internal aperture spaced from said first and said second longitudinally directed internal apertures, and a laterally directed aperture,
   said laterally directed aperture being elongated in the direction of the longitudinal axis,
   said second and said third longitudinally directed internal apertures having communication with said first longitudinally directed internal aperture, said second longitudinally directed internal aperture also having communication with said inlet, and said third longitudinally directed internal aperture also having communication with said outlet;
   a valve mounted to reciprocate in said first longitudinally directed internal aperture of said piston, said valve having a first structure for engaging a source of motion to move said valve in a reciprocating manner,
   a second structure for connecting to said piston to selectively move said piston, and
   a third structure for providing communication with said second and said third longitudinally directed internal apertures of said piston,
   wherein during a cycle of movement of said piston and said valve, said valve moves together with said piston during a part of the cycle and said valve moves when said piston is stationary during another part of the cycle.

2. The apparatus of claim 1 wherein:
   said first longitudinally directed internal aperture of said piston is centrally located in said piston;
   said first structure comprises a threaded opening;
   said second structure includes an aperture in the valve, said laterally directed aperture of said piston and a pin extending through said valve aperture and said piston lateral aperture; and
   said third structure comprises additional valve apertures.

3. The apparatus of claim 1 including:
   first and second elongated grooves formed in an outer surface of said piston, said first groove being in communication with said inlet and with said second longitudinally directed internal aperture and said second groove being in communication with said outlet and with said third longitudinally directed internal aperture.

4. The apparatus of claim 1 including:
   second and third lateral apertures in said piston, said second lateral aperture being in communication with said inlet and with said second longitudinally directed internal aperture, and said third lateral aperture being in communication with said outlet and with said third longitudinally directed internal aperture.

5. The apparatus of claim 1 including:
   another longitudinally directed aperture formed in said piston for aligning said piston in said cylinder.

6. The apparatus of claim 3 including:
   second and third lateral apertures in said piston, said second lateral aperture being in communication with said first groove and with said second longitudinally directed internal aperture, and said third lateral aperture being in communication with said second groove and with said third longitudinally directed internal aperture.

7. The apparatus of claim 6 wherein:
   said first longitudinally directed internal aperture of said piston is centrally located in said piston.

8. A food metering and dispensing device comprising:
   a metering pump assembly, said pump assembly having an inlet and an outlet;
   an inlet structure connecting said inlet of said pump assembly and a source of food to be pumped;
   a discharge structure connected to said outlet of said pump assembly;
   a control assembly connected to said pump assembly for operating said pump assembly in a predetermined manner; and
   a switch for starting a cycle of said pump assembly, said pump assembly including a product cylinder for forming a product chamber, a product piston with a longitudinally directed aperture, a valve located to move in said longitudinally directed aperture of said product piston, a structure connected to said valve for moving said valve in said longitudinally directed aperture, and a second structure that allows said product piston to be stationary while said valve is moving.

9. The apparatus of claim 8 wherein:
   said moving structure connected to said valve includes a valve piston and a valve cylinder.

10. The apparatus of claim 9 including:
    a third structure for causing said valve piston to have a shorter or longer stroke whereby the volume of said product chamber is adjustable.

11. The apparatus of claim 10 wherein:
    said second structure includes a lateral aperture in said product piston, a lateral aperture in said valve and a pin, said lateral aperture in said product piston being elongated and having first and second ends in a longitudinal direction, and said pin being mounted in said lateral aperture of said product piston and being movable between said first and said ends;

said pin is mounted in said lateral aperture of said valve; and said valve is movable in a linear direction without rotation.

12. The apparatus of claim 11 wherein:

said third structure includes a screw mounted to said valve piston cylinder for abutting said valve piston wherein the stroke of said valve piston is adjustable.

13. The apparatus of claim 12 wherein:

said product piston includes second and third longitudinally directed apertures spaced from each other and from said first mentioned longitudinally directed aperture and in communication therewith, said first mentioned and said second and said third longitudinally directed apertures being located internal of said product piston.

14. The apparatus of claim 13 wherein:

said product piston includes second and third lateral apertures in communication with said first mentioned longitudinally directed aperture, said second and third lateral apertures being spaced from each other in a longitudinal direction.

15. The apparatus of claim 14 including:

first and second end caps for closing said product cylinder; and retaining pins for maintaining said end caps in position during use.

16. The apparatus of claim 15 including:

an anti-rotation pin for engaging said product piston and an end cap.

17. The apparatus of claim 16 including:

a mounting frame; and a bracket for connecting said pump assembly to said mounting frame.

18. The apparatus of claim 17 wherein:

said product piston includes two circumferential grooves for receiving o-ring seals.

19. The apparatus of claim 13 wherein:

said valve is generally cylindrical and includes two lateral apertures being spaced from one another and from each other and offset from one another; and said product piston includes second and third lateral apertures, said two lateral apertures of said valve being selectively aligned with said second and third lateral apertures of said product piston to form passageways for product moving to and from said product chamber.

* * * * *